United States Patent
Williams et al.

(10) Patent No.: US 9,623,961 B2
(45) Date of Patent: Apr. 18, 2017

(54) AIRCRAFT LANDING GEAR LOCK ASSEMBLY

(71) Applicant: Messier-Dowty Limited, Gloucester, Gloucestershire (GB)

(72) Inventors: Lee Richard Williams, Cinderford (GB); Benjamin Graeme Derek Clark, Ruardean (GB); Alan Christopher Kendall, Newtown (GB); Mark Benjamin Collins, Cheltenham (GB)

(73) Assignee: Safran Landing Systems UK Ltd (GB)

( * ) Notice: Subject to any disclaimer, the term of this patent is extended or adjusted under 35 U.S.C. 154(b) by 257 days.

(21) Appl. No.: 14/612,867

(22) Filed: Feb. 3, 2015

(65) Prior Publication Data

US 2015/0217859 A1 Aug. 6, 2015

(30) Foreign Application Priority Data

Feb. 4, 2014 (EP) .................................... 14153817

(51) Int. Cl.
*B64C 25/26* (2006.01)
*E05C 3/00* (2006.01)
*E05B 85/04* (2014.01)

(52) U.S. Cl.
CPC .............. *B64C 25/26* (2013.01); *E05B 85/04* (2013.01); *E05C 3/00* (2013.01)

(58) Field of Classification Search
CPC ..... E05C 3/00; E05C 3/06; E05C 3/08; E05C 3/10; E05C 3/12; E05C 3/16; E05C 3/162; E05C 3/165; E05C 3/167; E05C 3/38; E05B 15/0295; E05B 85/04; B05B 85/045; B64C 25/26; B64C 25/14

USPC ..... 292/95, 96, 97, 194, 196, 201, 220, 221, 292/223, DIG. 23, 340, 341, 341.12, 292/341.13; 244/102 SL

See application file for complete search history.

(56) References Cited

U.S. PATENT DOCUMENTS

| | | | |
|---|---|---|---|
| 2,423,501 A * | 7/1947 | Johnson | B64C 25/26 244/102 SL |
| 2,433,630 A | 12/1947 | Sherman | |
| 2,569,967 A | 10/1951 | Ashton | |

(Continued)

FOREIGN PATENT DOCUMENTS

| | | |
|---|---|---|
| CN | 102107585 | 6/2011 |
| GB | 190106003 A * | 6/1902 |

(Continued)

OTHER PUBLICATIONS

European Search Report mailed Jul. 14, 2014 for European Application No. 14153817.3.

*Primary Examiner* — Brian M O'Hara
*Assistant Examiner* — Assres H Woldemaryam
(74) *Attorney, Agent, or Firm* — RatnerPrestia

(57) ABSTRACT

An aircraft assembly including a first part having a pin and a second part having a hook that is movable in an engagement plane to engage the pin to hold the first part in a condition relative to the second part. The pin has a prominent central portion and one or more axially spaced outer portions, the prominent portion is prominent with respect to the outer portions in the engagement plane to cause contact to be made between the hook and the pin within the central portion of the pin, rather than the outer portions of the pin.

7 Claims, 4 Drawing Sheets

(56) References Cited

U.S. PATENT DOCUMENTS

| | | | | |
|---|---|---|---|---|
| 2,720,369 | A | * 10/1955 | Detzer | B64C 25/26 24/598.4 |
| 3,168,876 | A | 2/1965 | Clejan | |
| 4,392,622 | A | 7/1983 | McClaflin | |
| 4,493,680 | A | 1/1985 | Hoffmann | |
| 4,568,045 | A | 2/1986 | Mayer | |
| 5,040,747 | A | * 8/1991 | Kane | B64C 25/26 244/102 R |
| 2006/0163426 | A1 | * 7/2006 | Smith, III | B64C 25/26 244/102 R |
| 2006/0208501 | A1 | * 9/2006 | Harvey | B64C 25/26 292/201 |
| 2009/0284025 | A1 | * 11/2009 | Salcombe | B64C 25/26 292/201 |
| 2012/0256050 | A1 | 10/2012 | Hilliard | |

FOREIGN PATENT DOCUMENTS

| | | |
|---|---|---|
| GB | 194745 | 3/1928 |
| GB | 762729 | 12/1956 |
| GB | 1102080 | 2/1968 |
| GB | 2161202 | 1/1986 |
| GB | 2460088 | 11/2009 |
| GB | 2495999 | 5/2013 |
| WO | 2005005252 | 1/2005 |

* cited by examiner

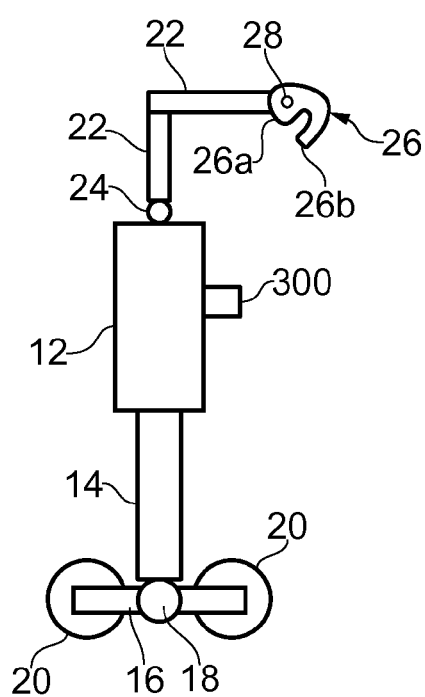
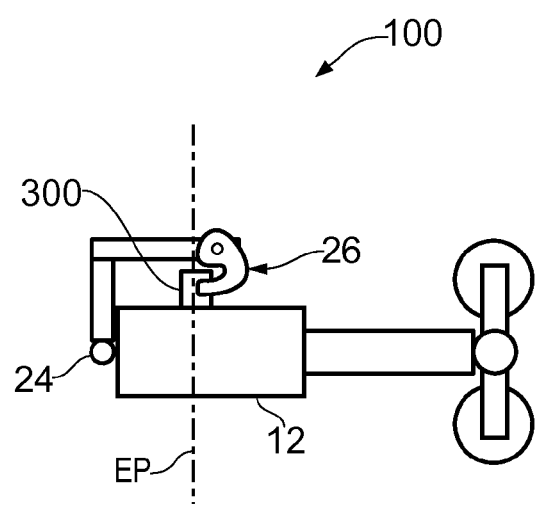
FIG. 1a (Prior Art)
FIG. 1b (Prior Art)

AIRCRAFT LANDING GEAR LOCK ASSEMBLY

This application claims the benefit of European Application No. EP 14153817.3, filed Feb. 4, 2014, the entire disclosure of which is incorporated herein by reference.

BACKGROUND

It is known for an aircraft assembly to include a part that is movable to an operating condition, in which condition the part is maintained by a lock. For example, an aircraft landing gear assembly is generally arranged to be moved between deployed and stowed conditions. Lock assemblies are provided to lock the landing gear assembly in the deployed and stowed conditions. These lock assemblies are referred to as the 'down lock' and 'up lock' respectively.

One type of known lock is a 'hook and pin' lock. In the context of an up lock, the main fitting of the landing gear carries the pin. The hook is pivotally mounted to the airframe and operable to engage the pin when the landing gear assembly is in the stowed condition to maintain the landing gear assembly in the stowed condition.

Rigging tolerances can mean that the pin engages the lock in a sub-optimal manner. To account for this possibility, it is known to increase the size of the pin. However, this can increase the weight and cost of the landing gear assembly.

SUMMARY

According to a first aspect of the invention, there is provided an aircraft assembly having a first part, a second part that is movably mounted relative to the first part so as to be movable between a first condition and a second condition, and a lock assembly. The lock assembly includes an elongate pin coupled to one of the first and second parts, and a hook movably coupled to a second one of the first and second parts and being arranged to be moved to an engagement condition for engagement with a contact surface of the pin when the second one of the first and second parts is in the second condition in order to maintain the second one of the first and second parts in the second condition. The pin includes a centre portion which defines the contact face, and one or more outer portions each axially spaced from the centre portion and defining a recessed face. The contact face of the centre portion is radially spaced further from the longitudinal axis of the pin in comparison to the one or more recessed faces.

Thus, the pin includes a prominent centre portion such that contact is made between the hook and pin at the centre portion, even when a degree of offset exists between the hook and pin that would otherwise have resulted in the contact point residing outside of the acceptable limits defined by the centre portion.

It is preferred that the pin has a first recessed outer portion axially adjacent to one end of the centre portion and a second recessed portion axially adjacent the other end of the centre portion. This enables the pin to control the point of contact with a hook which is offset in either direction from the pin centre.

The centre portion and outer portions can be cylindrical in shape, with the outer portions having a smaller diameter than the centre portion. In embodiments of the invention this leads to a pin which is simple to manufacture using a lathe.

Alternatively, the recessed faces of the outer portions can be defined by grooves or channels formed in the outer surface of the pin which extend orthogonally with respect to the longitudinal axis of the pin, leaving a relatively prominent centre portion between the grooves that is radially spaced further from the longitudinal axis of the pin in comparison to the one or more recessed faces. In embodiments of the invention this provides for a strong pin because only the contact side of the pin has material removed.

The pin can be a parallel-sided bar having a longitudinal axis which is generally orthogonal with respect to the movement plane of the second part between the first and second conditions.

The aircraft assembly can comprise a landing gear assembly. The second part can comprise a main fitting. The first part can comprise a structural member arranged to be coupled to an airframe.

Thus, embodiments of the invention relate to an aircraft assembly including a first part having a pin and a second part having a hook that is movable in an engagement plane to engage the pin to hold the first part in a condition relative to the second part. The pin has a central portion and axially spaced outer portions, the centre portion being prominent with respect to the outer portions in the engagement plane to cause contact to be made between the hook and the pin within the central portion rather than an outer portion.

BRIEF DESCRIPTION OF THE DRAWINGS

Embodiments of the invention will now be described with reference to the accompanying drawings, in which:

FIGS. 1a and 1b are schematic diagrams of a known landing gear assembly in a deployed condition and stowed condition respectively.

DETAILED DESCRIPTION

Figure 2:
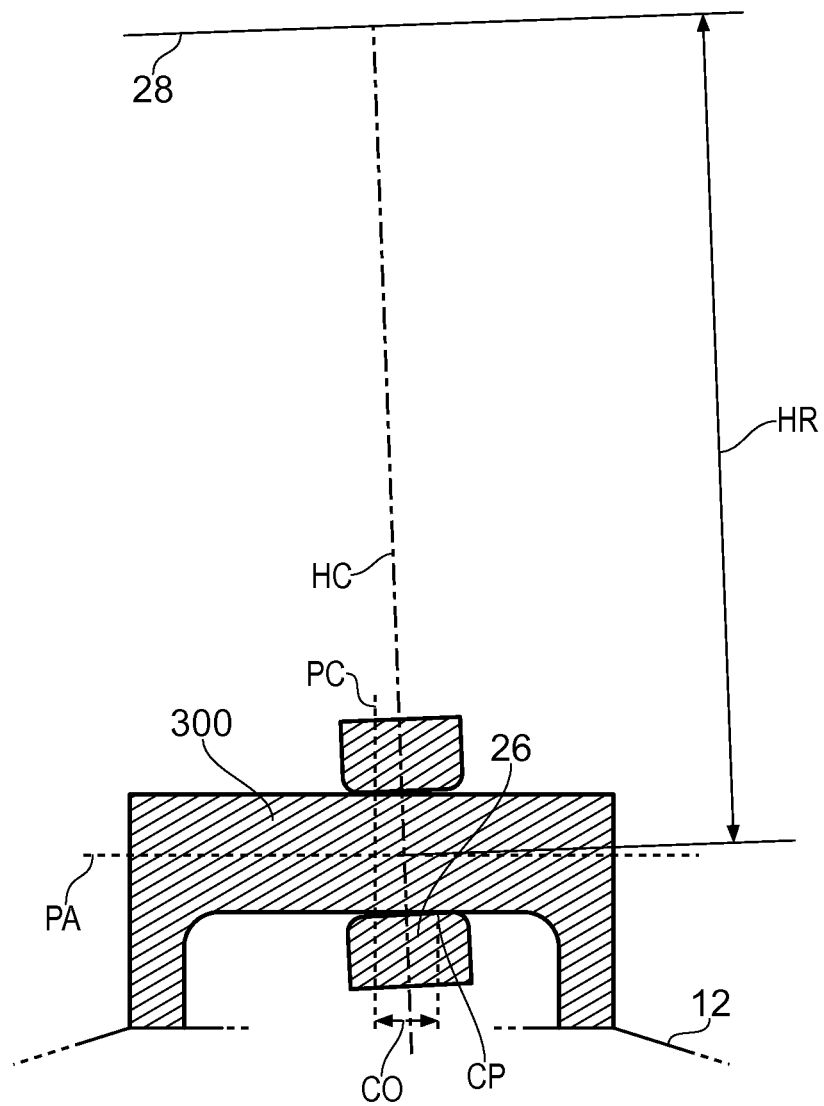
FIG. 2 is a schematic diagram illustrating the offset that can occur between a pin and hook of a lock assembly of the landing gear assembly of FIGS. 1a and 1b.

FIGS. 1a and 1b show a conventional landing gear assembly 100 including an up lock assembly 26, 300.

The landing gear assembly includes a main fitting 12 that telescopically carries a slider 14 to form a shock absorber. A lower part of the slider 14 is pivotally coupled to a bogie beam 16 via pivot pin 18. The bogie beam 16 carries a number of wheel and brake assemblies 20.

The main fitting 12 is pivotally coupled to the airframe 22 via pivot pin 24 so as to be moveable by a retraction actuator (not shown) between a deployed condition, shown in FIG. 1a, and a stowed condition, shown in FIG. 1b.

Referring additionally to FIG. 2, the up lock assembly 26, 300 including a steel pin 300 mounted to the main fitting 12 and configured to be captured by a hook 26 that is movably mounted to the airframe 22 via pin joint 28. The pin 300 is an elongate, parallel-sided bar having a longitudinal axis PA which is generally orthogonal with respect to the movement plane of the main fitting 12 between the deployed and stowed conditions. The pin 300 can be coupled to the main fitting 12 by any suitable means.

The hook 26 is movable by an actuator (not shown) to an engagement condition, shown in FIG. 1b, in which the hook 26 engages the pin 300 to maintain the main fitting in the stowed condition. The hook 26 has a swing radius HR.

The present inventors have identified that the optimum set up for a hook and pin lock is one in which the hook centre movement plane HC, which will be referred to as the "hook centre" HC, and pin centre plane PC, which will be referred to as the "pin centre" PC, are coplanar. This results in central loading of the pin.

However, in practice, there can be an angular and/or linear offset between the hook centre HC and the pin centre PC, due to rigging tolerances. An offset between the hook centre HC and the pin centre PC results in the contact point CP occurring away from the pin centre PC, resulting in a contact offset CO with respect to the pin centre PC. This non-central loading of the pin 300 can cause the pin 30 to fracture.

Figure 3:
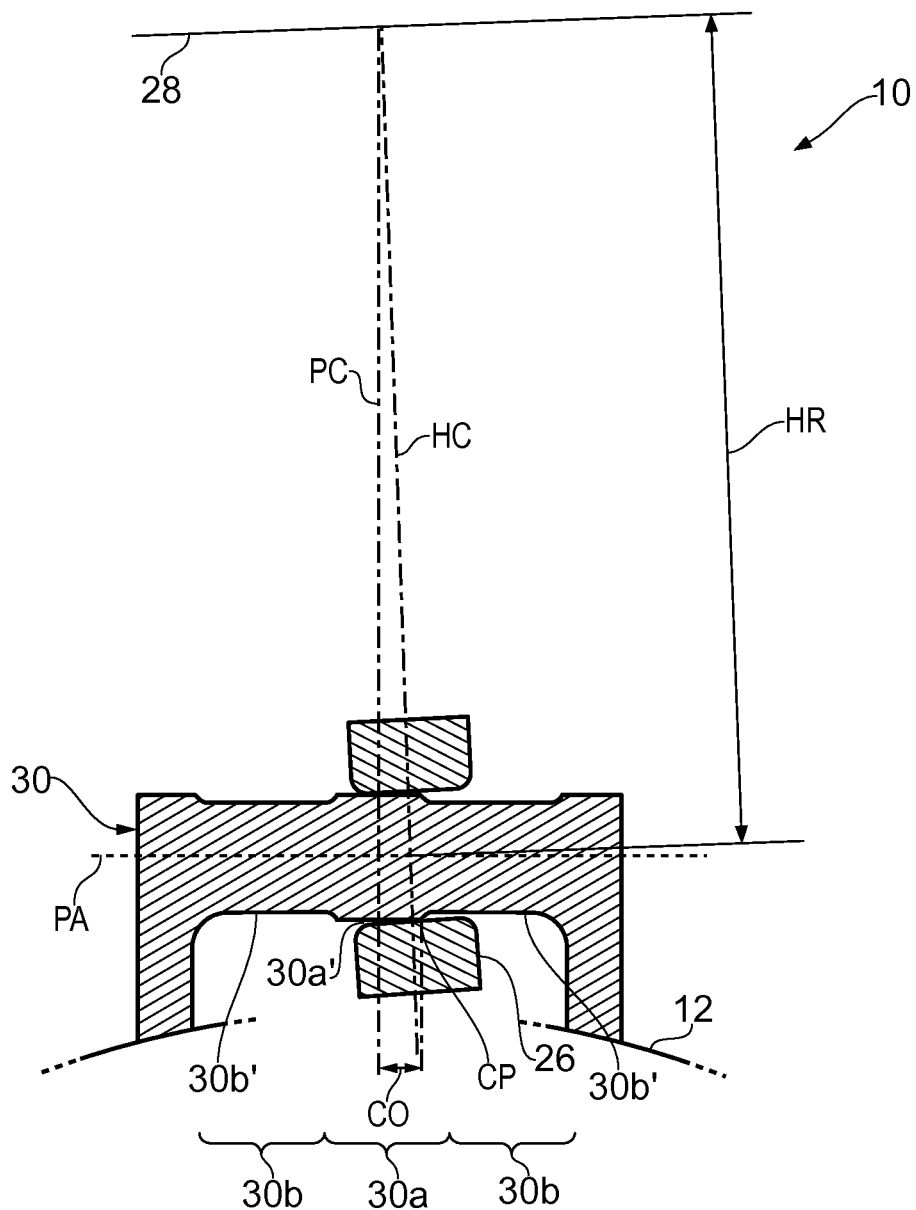
FIG. 3 is a schematic diagram illustrating the offset that can occur between a pin and hook of a lock assembly of a landing gear assembly according to an embodiment of the invention.

FIG. 3 show parts of a landing gear assembly 10 according to an embodiment of the invention. The landing gear assembly 10 is similar to the known landing gear assembly 100 and, for brevity, like parts will not be described.

The landing gear assembly 10 differs from the known landing gear assembly 100 in that the pin 30 is shaped or profiled to increase the likelihood of the contact point CP being within acceptable offset limits from the pin centre PC. This is achieved by a centre portion 30a of the pin 30 defining a contact surface that is offset from the longitudinal axis PA by a greater amount than recessed a pair of surfaces defined by a pair of outer portions 30b and between which the centre portion 30a is situated. Put another way, the contact face 30a' defined by centre portion 30a is radially spaced further from the longitudinal axis PA of the pin in comparison to the recessed faces 30b' which are defined by the outer portions 30b.

Figure 4:
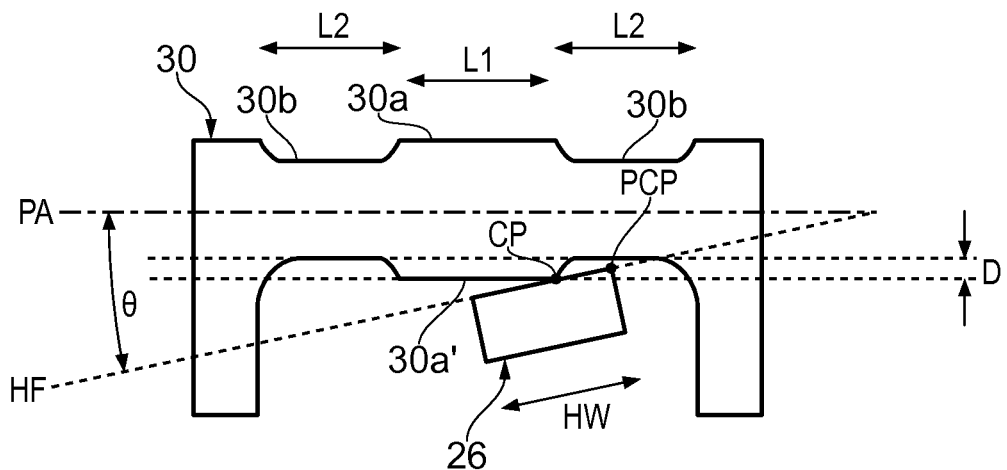
FIG. 4 is a schematic diagram focusing on the engagement profile of the pin of the lock assembly of FIG. 3.

Referring additionally to FIG. 4, an angular offset of the hook centre HC with respect to the pin centre PC results in the engagement face of the hook 26 defining a general plane HF that is orientated at a non-zero angle θ with respect to the longitudinal axis PA of the pin 30. The contact face of the hook has a width HW of 16 mm, but in other embodiments this may vary depending on the application. The depth D of the outer portions 30b relative to the diameter of the centre portion 30a should be sufficient to prevent contact with the hook 26 when the contact point CP occurs on the centre portion 30a. It is preferred that the depth D is a nominal 1 mm deeper than the worst case contact situation between the hook 26 and pin 30, accounting for finishing coatings on the hook 26 and pin 30. The angled contact face of the hook 26 may be considered to equate to the hypotenuse of a triangle along which a contact point CP can be made with the engagement surface 30a' of the centre portion 30a to reduce the length of the hypotenuse; the opposite and adjacent sides of the reduced length hypotenuse represent the depth and offset of a contact point to be prevented PCP.

The centre portion 30a is centred on the pin centre PC. The length L1 of the centre portion defines the offset limits for contact with the hook; it is preferred that the length L1 is at least is at least the hook width HW.

The length L2 of each outer portion should be sufficient to encompass contact points of an unacceptable offset PCP that could in practice occur due to rigging tolerances but for the reduced diameter outer portions. The lateral offset would be of the order of the rigging offset plus half the hook contact face HW. The length L2 of each outer portion 30b can be determined by the equation L2=maximum contact offset in practice−maximum permitted contact offset. The rigging tolerance is defined as the allowable range around the optimal hook and pin lock setting within which the hook and pin lock must fall relative to each other to account for assembly tolerances of associated parts.

The pin 30 contact profile can be formed by any suitable means; for example, machining with a lathe to reduce the diameter of the outer portions 30b to depth D.

Figure 5:
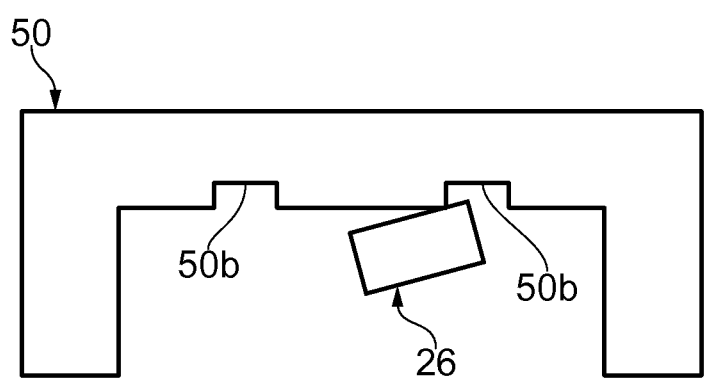
FIG. 5 is a schematic diagram focusing on the engagement profile of a pin of a lock assembly of a landing gear assembly according to a further embodiment of the invention.

Referring to FIG. 5, the relatively narrow outer portions 50b have been defined by channels which extend generally orthogonal with respect to the longitudinal axis PA of the pin, with the centre portion 50a between them. This can increase the overall strength of the pin 50 in comparison to the embodiment described with reference to FIG. 4.

In other embodiments, the prominent centre portion can be created by any suitable means; for example, an additional part such as a sleeve on the pin or a stud feature protruding radially from the pin at the appropriate contact point.

While the embodiments have been described with respect to a landing gear assembly up lock, it will be appreciated that in other embodiments the pin with a prominent centre portion can be included as part of a lock assembly arranged to maintain a first part of an aircraft assembly at a particular condition with respect to another part.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

We claim:

1. An aircraft landing gear lock assembly comprising:
a first part, wherein the first part comprises an airframe;
a second part that is movably mounted relative to the first part so as to be movable between a first condition and a second condition, wherein the second part comprises a main fitting; and
a lock assembly comprising:
a pin elongated along a longitudinal axis and coupled to a first one of the first part and the second part; and
a hook movably coupled to a second one of the first part and the second part and being movable to an engagement condition for engagement with a contact surface of the pin when the second one of the first part and the second part is in the second condition in order to maintain the second one of the first part and the second part in the second condition;
wherein the pin includes:
a prominent portion which defines a contact face; and
one or more outer portions axially spaced from the prominent portion and defining one or more respective recessed faces, the contact face of the prominent portion being radially spaced further from the longitudinal axis of the pin in comparison to the one or more respective recessed faces.

2. The aircraft landing gear lock assembly according to claim 1, wherein the pin has a first recessed outer portion axially adjacent to one end of the prominent portion and a second recessed outer portion axially adjacent the other end of the prominent portion.

3. The aircraft landing gear lock assembly according to claim 2, wherein the prominent portion and the one or more outer portions are cylindrical, with the one or more outer portions having smaller diameters than the prominent portion.

4. The aircraft landing gear lock assembly according to claim 1, wherein the prominent portion, the first recessed outer portion and the second recessed outer portion are cylindrical, and the first recessed outer portion and the second recessed outer portion have smaller diameters than the prominent portion.

5. The aircraft landing gear lock assembly according to claim 1, wherein the one or more outer portions are defined by grooves or channels formed in an outer surface of the pin, the grooves or channels extending orthogonally with respect to the longitudinal axis of the pin, and the prominent portion is defined between the grooves or channels.

6. The aircraft landing gear lock assembly according to claim 1, wherein the hook is pivotally connected to the airframe and the pin is coupled to the main fitting.

7. The aircraft landing gear lock assembly according to claim 6, wherein the main fitting pivots relative to the airframe in a movement plane, and the longitudinal axis of the pin is orthogonal to the movement plane.

\* \* \* \* \*